United States Patent
Sanada et al.

(10) Patent No.: US 11,161,359 B2
(45) Date of Patent: Nov. 2, 2021

(54) CRADLE HAVING BASE PORTION AND GUIDE PORTION FOR DETACHABLY HOLDING PRINTER THERETO

(71) Applicant: BROTHER KOGYO KABUSHIKI KAISHA, Nagoya (JP)

(72) Inventors: Hitoshi Sanada, Nagoya (JP); Takehiko Inaba, Aichi-ken (JP); Yuki Nagashima, Toyokawa (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/584,345

(22) Filed: Sep. 26, 2019

(65) Prior Publication Data

US 2020/0171862 A1 Jun. 4, 2020

(30) Foreign Application Priority Data

Nov. 30, 2018 (JP) .............................. JP2018-224552

(51) Int. Cl.
*B41J 25/34* (2006.01)
*H02M 7/00* (2006.01)
*H02G 3/04* (2006.01)

(52) U.S. Cl.
CPC ............ *B41J 25/34* (2013.01); *H02G 3/0456* (2013.01); *H02M 7/003* (2013.01)

(58) Field of Classification Search
CPC ........ B41J 25/34; B41J 19/005; H02M 7/003; H02G 3/0456
See application file for complete search history.

(56) References Cited

U.S. PATENT DOCUMENTS

2004/0150368 A1 8/2004 Horigome
2016/0236493 A1 8/2016 Lyman et al.

FOREIGN PATENT DOCUMENTS

JP 2004-229449 A 8/2004

OTHER PUBLICATIONS

IP.com search (Year: 2020).*
IP.com search (Year: 2021).*
IP.com search 2 (Year: 2021).*

* cited by examiner

*Primary Examiner* — Lisa Solomon
(74) *Attorney, Agent, or Firm* — Kenealy Vaidya LLP

(57) ABSTRACT

A cradle includes: a base portion; and a guide portion. The base portion is configured to hold a printer to which one of a battery and a converter is selectively and detachably attached. The printer is driven by DC power supplied from the one of the battery and the converter to perform printing operation. The converter includes: a main body portion; and a wiring harness. The wiring harness has a first end and a second end. The first end is connected to the main body portion. The converter is configured to convert AC power supplied through the second end into DC power to be supplied to the printer through the first end. The guide portion is provided at the base portion. The guide portion is configured to guide the wiring harness in a case where the converter is attached to the printer.

10 Claims, 11 Drawing Sheets

CRADLE HAVING BASE PORTION AND GUIDE PORTION FOR DETACHABLY HOLDING PRINTER THERETO

CROSS REFERENCE TO RELATED APPLICATION

This application claims priority from Japanese Patent Application No. 2018-224552 filed Nov. 30, 2018. The entire content of the priority application is incorporated herein by reference.

TECHNICAL FIELD

The present disclosure relates to a cradle or a holding stand for holding a printer.

BACKGROUND

There has been conventionally known a cradle for holding a printer. Japanese Patent Application Publication No. 2004-229449 discloses a cradle for holding an ink jet printer. An ink jet printer to which a battery charger is attached is attachable to the cradle. The battery charger is a charging unit incorporating a rechargeable battery. The ink jet printer is driven by the battery of the battery charger to perform printing operation. The cradle is configured to charge the battery charger in the attached state of the ink jet printer to the cradle.

In a case where the ink jet printer is attached to the cradle, the battery charger is entered into an accommodating portion of the cradle from above while the battery charger is oriented downward. The accommodating portion is defined by an upper case and a bottom member of the cradle. Thus, the battery charger is accommodated in the accommodating portion, and the ink jet printer is held to the cradle with an upright posture of the ink jet printer.

At this time, a contact portion of the battery charger is brought into contact with a terminal portion provided at the bottom member of the cradle. By the connection of a jack of the cradle to a plug of an AC adapter, the battery of the battery charger is charged through the terminal portion and the contact portion.

A battery eliminator (hereinafter simply referred to as "eliminator") may be attached to the printer such as the ink jet printer instead of the battery charger. The eliminator includes a main body portion and a wiring harness. The main body portion has a shape approximately the same as the shape of the battery charger. The eliminator is configured to convert AC power supplied via the wiring harness into DC power, and supplies the DC power to the printer. The printer is driven by the DC power supplied from the eliminator to perform printing operation.

SUMMARY

Occasionally, a printer to which the eliminator is attached is used or operated while being held by the cradle. Here, in a case where the above-described accommodating portion of the cradle is applied for holding the printer, the wiring harness of the eliminator may be contacted with the bottom member of the cradle. In this case, the cradle may not stably hold the printer.

In view of the foregoing, it is an object of the disclosure to provide a cradle capable of stably holding a printer to which a converter such as an eliminator is attached.

In order to attain the above and other objects, according to one aspect, the present disclosure provides a cradle for use with a printer. One of a battery and a converter is selectively and detachably attachable to the printer. The printer is driven by DC power supplied from the one of the battery and the converter to perform printing operation. The converter includes: a main body portion; and a wiring harness. The wiring harness has a first end and a second end. The first end is connected to the main body portion. The converter is configured to convert AC power supplied through the second end into DC power to be supplied to the printer through the first end. The printer includes an accommodating portion. One of the battery and the main body portion is selectively accommodatable in the accommodating portion. The cradle includes: a base portion; and a guide portion. The base portion is configured to hold the printer to which one of the battery and the converter is attached. The guide portion is provided at the base portion. The guide portion is configured to guide the wiring harness in a case where the converter is attached to the printer.

According to another aspect, the present disclosure also provides a cradle. The cradle includes: a base portion; and a guide portion. The base portion is configured to hold a printer. The guide portion is provided at the base portion. The guide portion is configured to guide a wiring harness extending from the printer.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Embodiments of a cradle for use with a printer according to the present disclosure will be described while referring to the accompanying drawings.

<Outline of Printer and Cradle>

Figure 1:
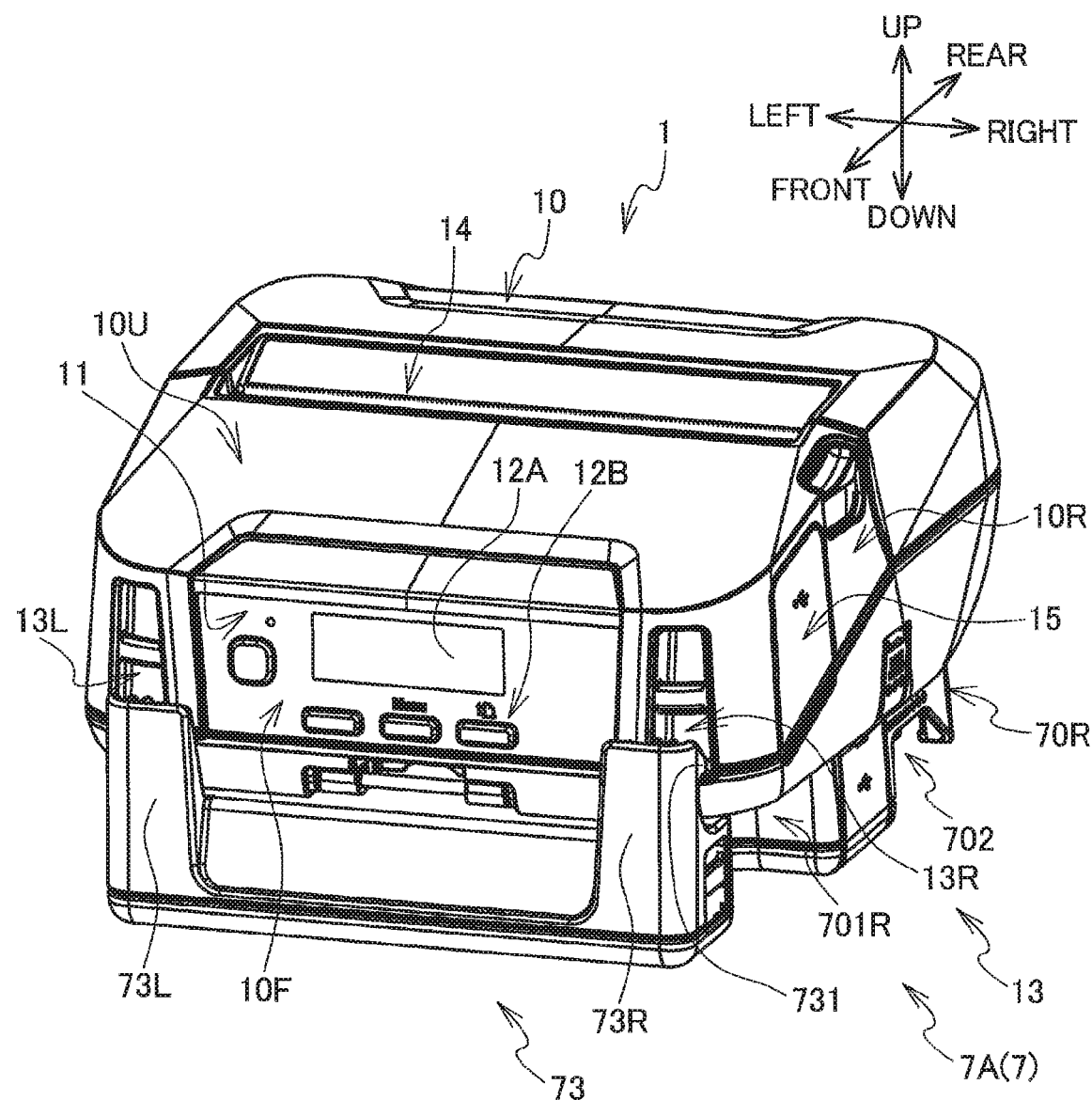
FIG. 1 is a perspective view of a printer and a cradle according to a first embodiment.
Figure 2:
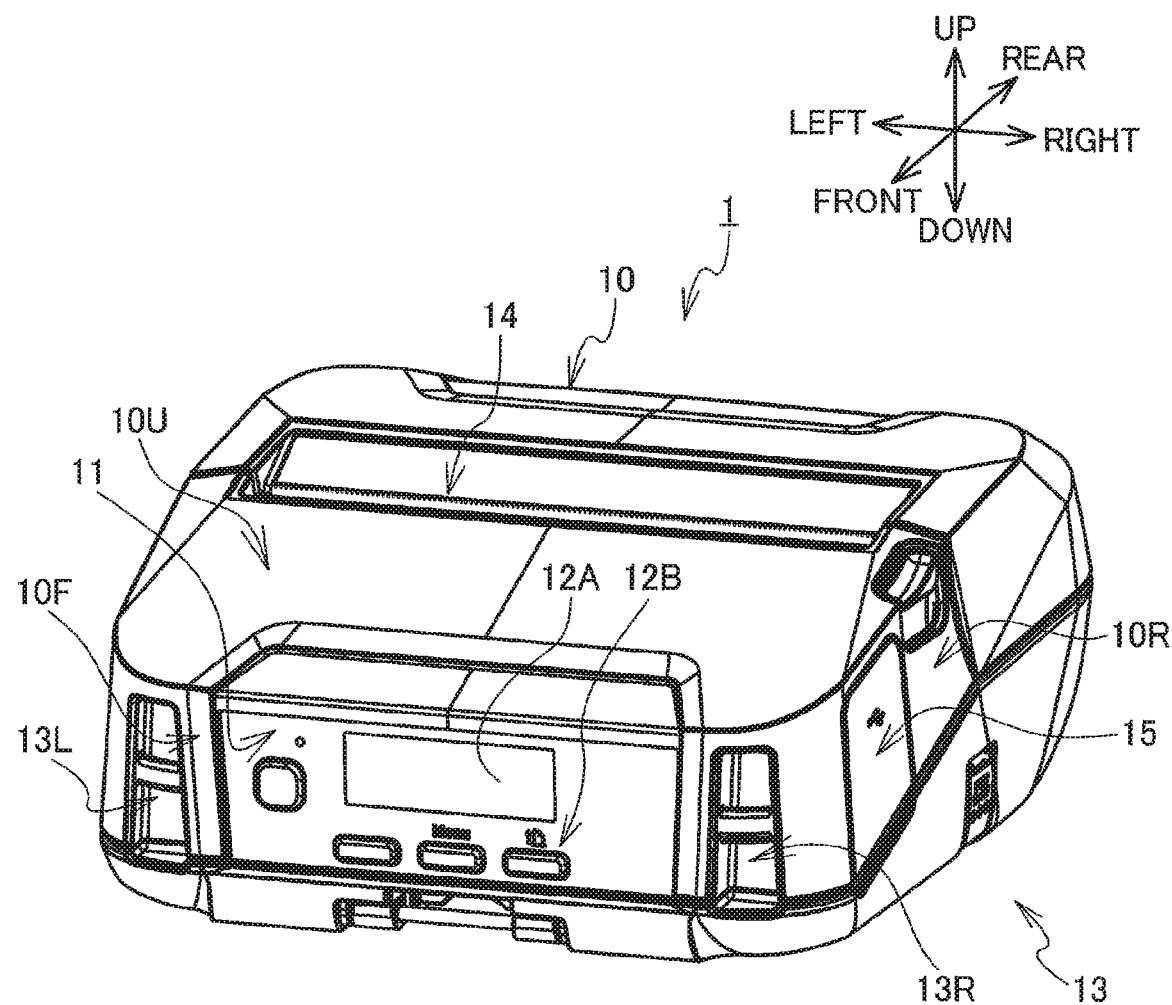
FIG. 2 is a perspective view of the printer as viewed from diagonally above.
Figure 3A:
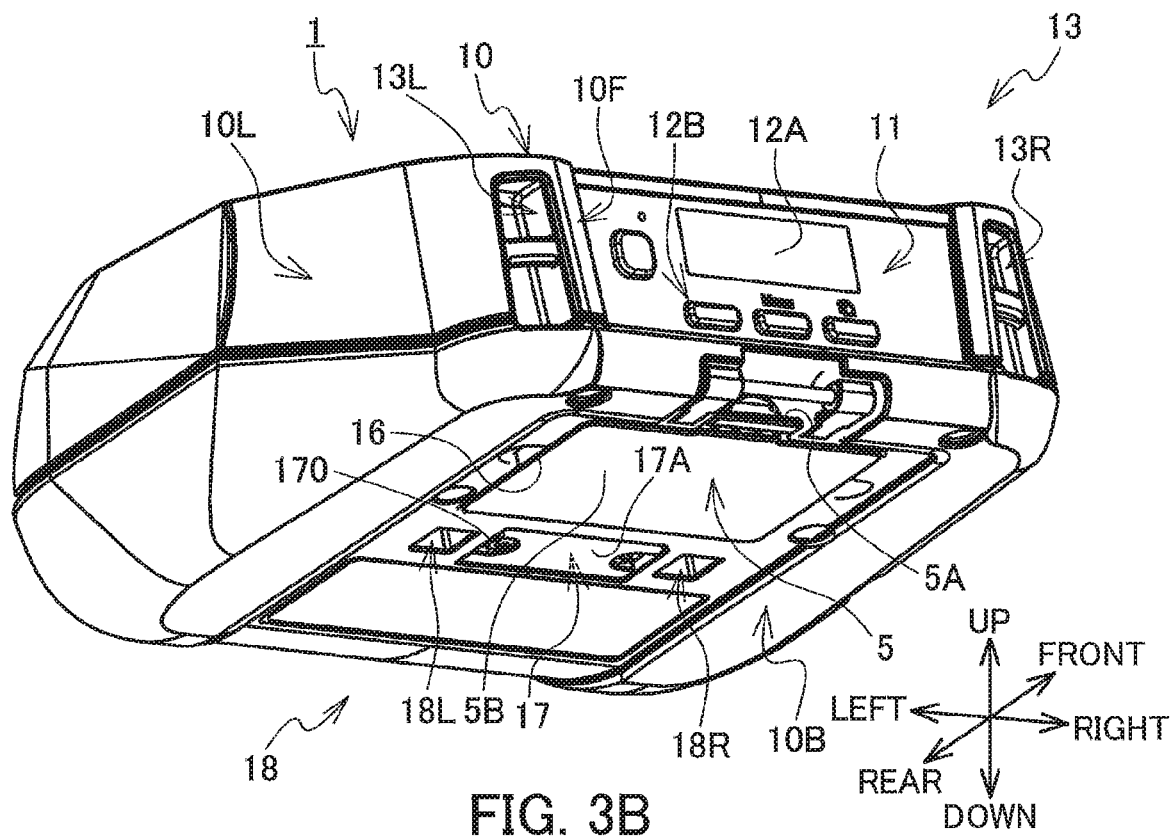
FIG. 3A is a perspective view of the printer to which a battery is attached as viewed from diagonally below.

A printer 1 illustrated in FIG. 1 is a heat sensitive mobile printer capable of being driven by a battery 5 (see FIG. 3A). The printer 1 is connectable to an external terminal device (not illustrated) through a USB cable. In the printer 1, characters such as letters and figures can be printed on a heat sensitive label by heat generation of an internal thermal head on the basis of input print data transmitted from the external terminal device. A personal computer (PC) is available as the external terminal device. The printer 1 is portable. For example, the printer 1 is attached to a waist belt of a user through a belt clip (not illustrated) or is held by an over-the-shoulder strap.

A cradle, for example, cradles 7A through 7F (see FIGS. 6 through 11, collectively referred to as "cradle 7") according to first through sixth embodiments is a stationary stand capable of holding the printer 1. The cradle 7 also functions as a charging stand capable of charging the battery 5 in a case where the printer 1 on which the battery 5 is mounted is attached to the cradle 7. Arrows indicated in FIG. 1 will be applied to all drawings for directions "upward", "downward", "frontward", "rearward", "leftward" and "rightward" with respect to the printer 1 and the cradle 7.

<Printer 1>

As illustrated in FIGS. 1, 2, 3A and 3B, the printer 1 includes a casing 10 having a generally rectangular parallelepiped shape. The casing 10 has a front surface 10F, an upper surface 10U, a bottom surface 10B, and a right surface 10R. A user interface 11 is provided at the front surface 10F at a position excluding a left end portion and a right end portion of the front surface 10F. The user interface 11 includes a liquid crystal display 12A and a plurality of operation buttons 12B.

The right end portion of the front surface 10F is provided with a counterpart engagement portion 13R, and the left end portion of the front surface 10F is provided with a counterpart engagement portion 13L. The counterpart engagement portions 13R and 13L will be collectively referred to as "counterpart engagement portion 13," The counterpart engagement portion 13 is recessed rearward. The counterpart engagement portion 13 includes an attachment bar to which a hook provided at each end of the over-the-shoulder strap is attachable. The counterpart engagement portion 13 is an example of the first counterpart engaging portion of the present disclosure.

An ejection opening 14 is open at the upper surface 10U of the casing 10 to permit the heat sensitive label already printed to be discharged outside through the ejection opening 14. A lid 15 made from rubber is provided at the right surface 10R of the casing 10. The lid 15 is configured to cover a USB connector (not illustrated) for the connection to the USB cable.

Figure 3B:
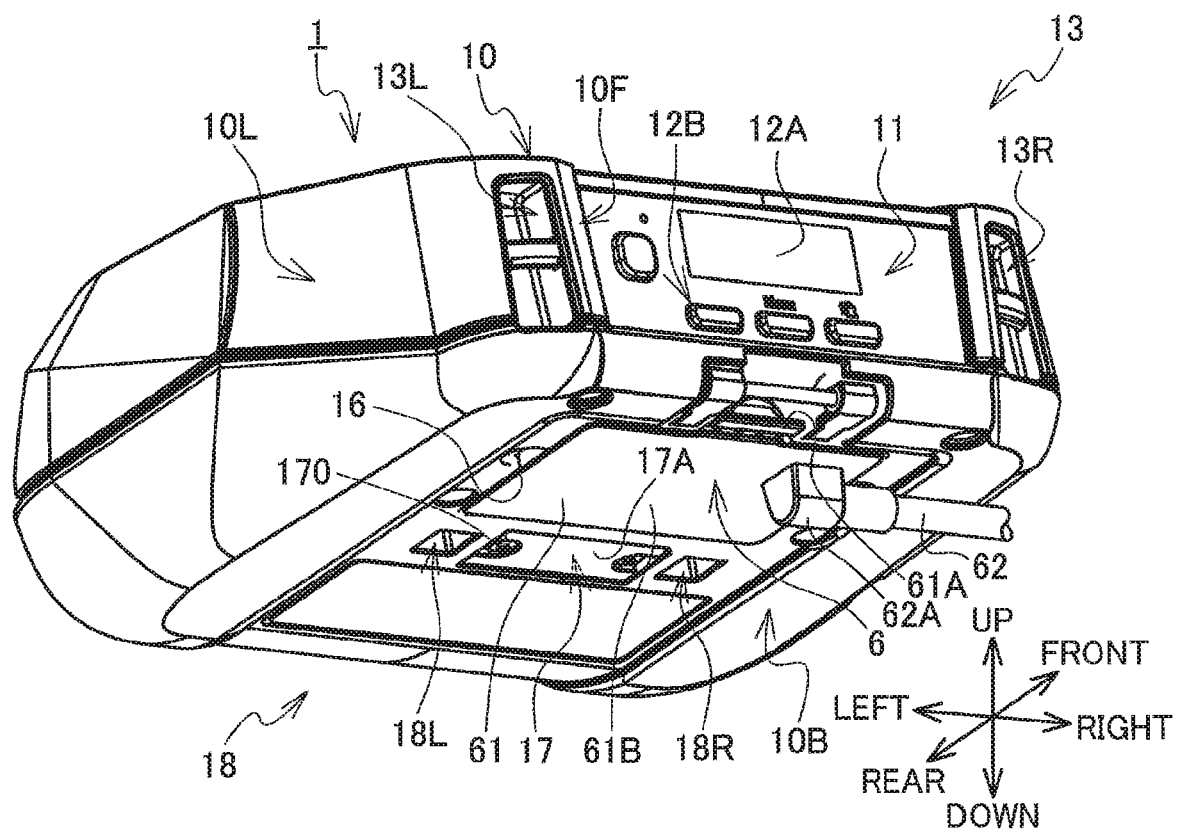
FIG. 3B is a perspective view of the printer to which an eliminator is attached as viewed from diagonally below.

As illustrated in FIGS. 3A and 3B, an accommodating portion 16 is provided at the bottom surface 10B of the casing 10. The accommodating portion 16 is recessed upward. One of the battery 5 (see FIG. 3A) and a main body portion 61 (see FIG. 3B) of an eliminator 6 is selectively accommodatable in the accommodating portion 16. That is, one of the battery 5 and the eliminator 6 is selectively attachable to the printer 1. The eliminator 6 is an example of the converter of the present disclosure.

FIG. 3A illustrates a state where the battery 5 is accommodated in the accommodating portion 16. The battery 5 has a generally rectangular parallelepiped shape that is generally coincident with a shape of the accommodating portion 16. In the accommodated state of the battery 5 in the accommodating portion 16, a position of the lower surface 10B is coincident with a position of a lower surface 5B of the battery 5 in the upward/downward direction. That is, the lower surface 10B of the casing 10 and the lower surface 5B of the battery 5 are flush with each other on a common imaginary horizontal plane.

In the accommodated state of the battery 5 in the accommodating portion 16, terminals (not illustrated) of the battery 5 and accommodating portion 16 are connected to each other. The battery 5 supplies DC power to the printer 1 through the terminals. The printer 1 is driven by the DC power supplied from the battery 5 to perform printing operation. Further, in a case where the printer 1 to which the battery 5 is attached is held to the cradle 7 as illustrated in FIG. 1, the battery 5 can be charged by the voltage supplied from the cradle 7.

The battery 5 has a front end portion provided with a hook 5A that is elastically deformable. The hook 5A is engaged with a front end portion of the accommodating portion 16 in the accommodated state of the battery 5 in the accommodating portion 16 in order to maintain the accommodated state of the battery 5. The hook 5A is deformed by the application of force directed rearward thereto to disengage the hook 5A from the front end portion of the accommodating portion 16. Hence, the battery 5 can be detached from the accommodating portion 16.

Figure 4:
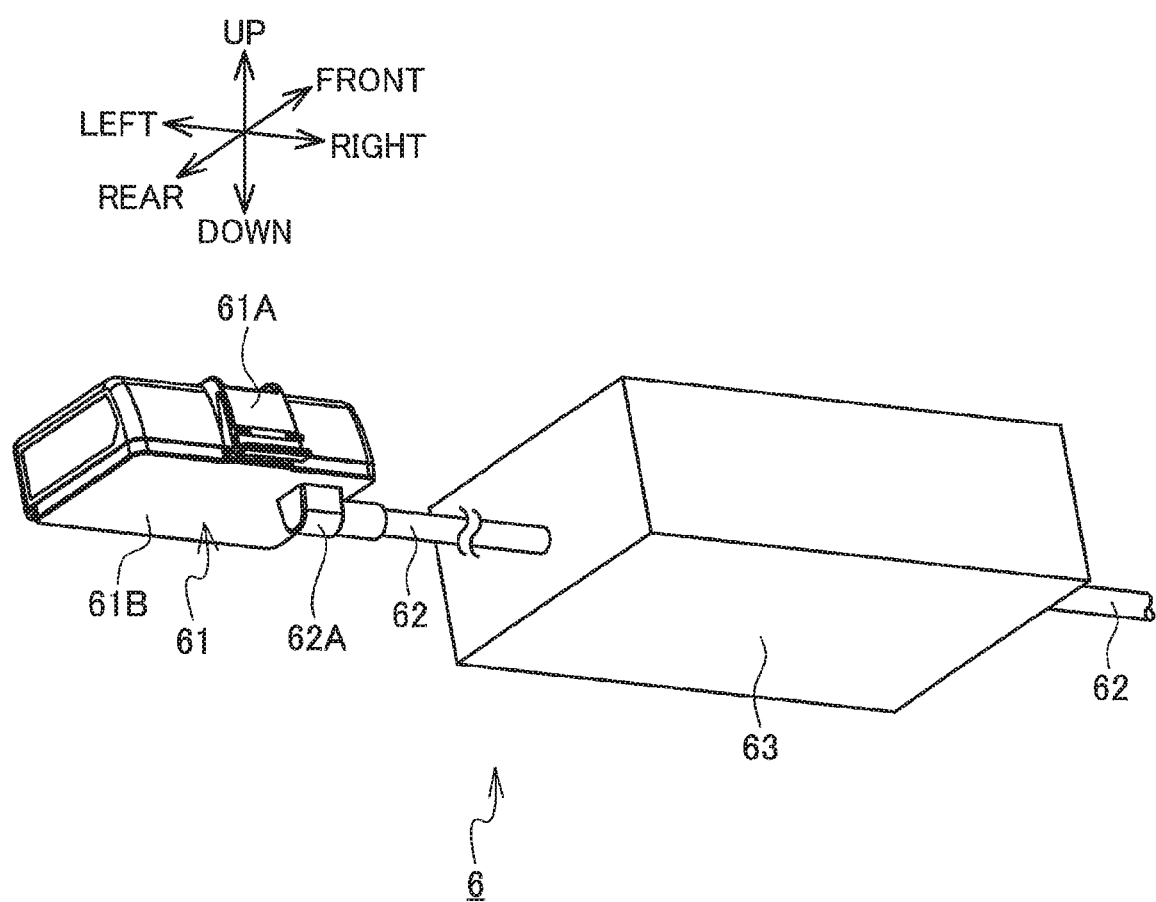
FIG. 4 is a perspective view of the eliminator.

FIG. 3B illustrates a state where the main body portion 61 of the eliminator 6 is accommodated in the accommodating portion 16. As illustrated in FIG. 4, the eliminator 6 includes the main body portion 61, a wiring harness 62, and a converting portion 63. The main body portion 61 is generally rectangular parallelepiped in shape which is generally coincident with the shape of the battery 5 (see FIG. 3A) and the shape of the accommodating portion 16 (see FIG. 3B).

The main body portion 61 has a front end portion provided with a hook 61A which is elastically deformable. The wiring harness 62 has one end connected to a lower surface 61B of the main body portion 61. The one end of the wiring harness is also referred to as "connecting portion 62A" with the main body portion 61. The wiring harness 62 extends rightward from the connecting portion with the main body portion 61. The wiring harness 62 has another end connected to an AC plug (not illustrated). In the present embodiment, the one end of the wiring harness 62 will be also referred to as "left end of the wiring harness 62" and the other end of the wiring harness 62 will be also referred to as "right end of the wiring harness 62." The left end of the wiring harness 62 is an example of the first end of the wiring harness of the present disclosure, and the right end of the wiring harness 62 is an example of the second end of the wiring harness of the present disclosure.

The converting portion 63 is connected to the wiring harness 62 at a position between the left and right ends thereof. The converting potion 63 includes an AC/DC converter. The converting portion 63 is configured to convert AC power supplied through the right end of the wiring harness 62 into DC power to the supplied to the printer through the left end of the wiring harness 62 and the main body portion 61. Incidentally, the eliminator 6 may include a DC plug instead of the AC plug at the right end of the wiring harness 62, and the converting portion 63 may include a DC/DC converter instead of the AC/DC converter.

As illustrated in FIG. 3B, in the accommodated state of the main body portion 61 of the eliminator 6 in the accommodating portion 16, the position of the lower surface 10B of the casing 10 is coincident with a position of the lower surface 61B of the main body portion 61. That is, the lower surface 10B of the casing 10 and the lower surface 61B of the main body portion 61 are flush with each other on the common imaginary horizontal plane.

On the other hand, the left end of the wiring harness 61 is at a position in the upward/downward direction lower than the lower surface 10B of the printer 1 and the lower surface 61B of the main body portion 61. Hence, the wiring harness 62 protrudes downward from the common imaginary horizontal plane.

In the accommodated state of the main body portion 61 of the eliminator 6 in the accommodating portion 16, terminals of the main body portion 61 and accommodating portion 16 are connected to each other. The converting portion 63 supplies DC power to the main body portion 61 through the wiring harness 62, and the main body portion 61 is configured to supply the supplied DC power to the printer 1 through the terminals. The printer 1 is driven by the DC power supplied from the main body portion 61 to perform printing operation.

In the accommodated state of the main body portion 61 of the eliminator 6 in the accommodating portion 16, the hook 61A is engaged with the front end portion of the accommodating portion 16 in order to maintain the accommodated state of the main body portion 61 in the accommodating portion 16. The hook 61A is deformed by the application of force directed frontward thereto to disengage the hook 61A from the front end portion of the accommodating portion 16. Hence, the main body portion 61 can be detached from the accommodating portion 16.

As illustrated in FIGS. 3A and 3B, the lower surface 10B of the casing 10 is formed with a recess 170 at a position rearward of the accommodating portion 16. A printer terminal 17 is provided inside the recess 170. The printer terminal 17 includes a plurality of electrodes arrayed with each other in the leftward/rightward direction. A lid 17A is provided for closing the recess 170. The printer terminal 17 is exposed to the outside by the detachment of the lid 17A. The printer 1 is held to the cradle 7 while the lid 17A is detached.

A counterpart locking portion 18R is provided at the lower surface 10B of the casing 10 at a position rightward of the printer terminal 17. Another counterpart locking portion 18L is provided at the lower surface 10B at a position leftward of the printer terminal 17. The counterpart locking portions 18R and 18L will be collectively referred to as "counterpart locking portion 18." The counterpart locking portion is recessed upward. The counterpart locking portion 18 has an open end having rectangular shape. The counterpart locking portion 18 is an example of the second counterpart engaging portion of the present disclosure.

<Cradle 7A>

A cradle 7A according to a first embodiment will be described with reference to FIGS. 1, 5, and 6. The cradle 7A includes a base portion 70. The base portion 70 is in the form of a plate perpendicular to the upward/downward direction and having a thickness in the upward/downward direction. The base portion 70 provides an internal space therein. The base portion 70 has an upper surface 70U, a lower surface 70B, a right surface 70R, a left surface 70L, a front surface 70F, and a rear surface 70S.

The upper surface 70U is generally flat shaped and extends in a horizontal direction. The right surface 70R has a recess 701R recessed leftward and positioned frontward of a center of the right surface in the frontward/rearward direction. The left surface 70L has a recess 701L recessed rightward and positioned frontward of a center of the left surface 70L in the frontward/rearward direction.

Figure 5:
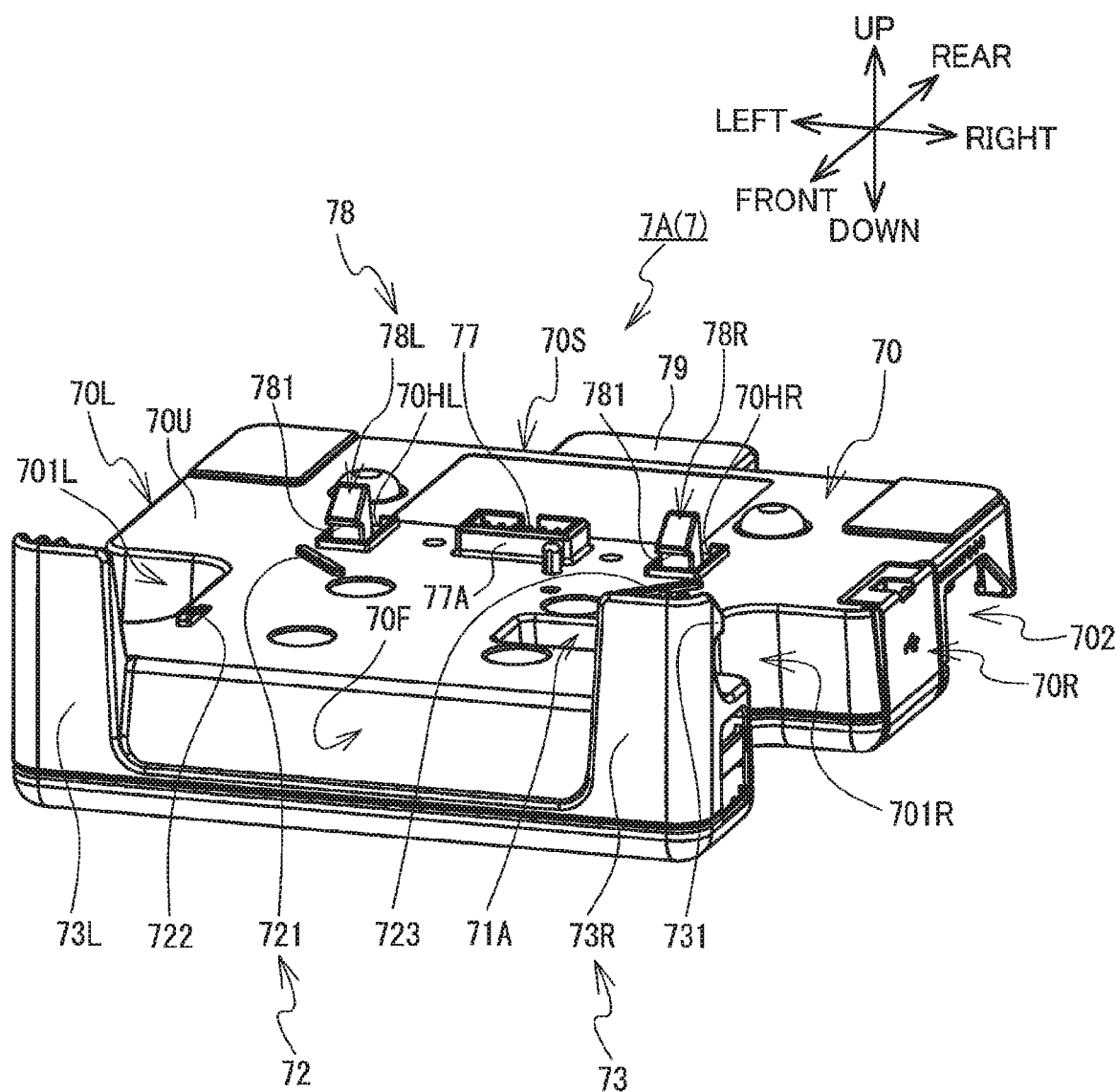
FIG. 5 is a perspective view of the cradle according to the first embodiment.

As illustrated in FIG. 5, a socket 702 is positioned at the right surface 70R at a position rearward of the recess 701R. A jack of an AC adapter (not illustrated) is connectable to the socket 702.

Figure 6:
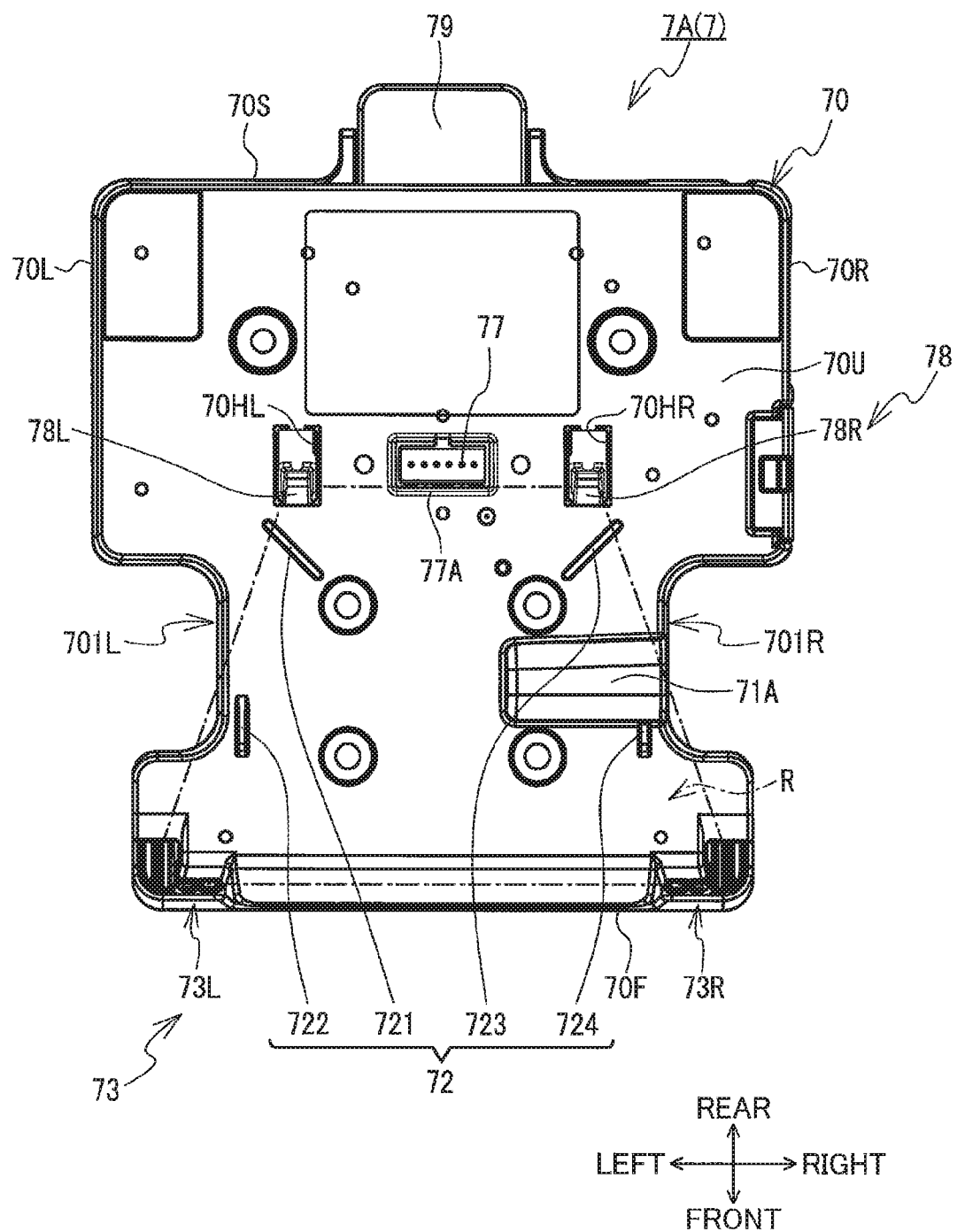
FIG. 6 is a plan view of the cradle according to the first embodiment.

As illustrated in FIGS. 5 and 6, an engagement portion 73R is provided at a right end portion of the front surface 70F. Further, an engagement portion 73L is provided at a left end portion of the front surface 70F. The engagement portions 73R and 731L will be collectively referred to as "engagement portion 73." The engagement portion 73 protrudes upward from the upper surface 70U. As illustrated in FIG. 5, the engagement portion 73 has an upper potion provided with a protruding portion 731 protruding rearward. The engagement portion 73 is an example of the first engaging portion of the present disclosure.

A plurality of seat portions 721 through 724 (collectively referred to as "seat portion 72") are provided at the upper surface 70U of the base portion 70. The seat portion 72 has a rib-like configuration extending along the upper surface 70U and protruding upward therefrom. As illustrated in FIG. 6, the seat portion 721 is positioned diagonally rightward and rearward of a bottom portion of the recess 701L of the left surface 70L. The seat portion 721 extends diagonally frontward and rightward as viewed in the frontward direction. The seat portion 723 is positioned diagonally leftward and rearward of a bottom portion of the recess 701R of the right surface 70R. The seat portion 723 extends diagonally frontward and leftward as viewed in the frontward direction. The seat portions 721 and 723 are arranged symmetrically in the leftward/rightward direction.

The seat portion 722 is positioned rightward of the bottom portion of the recess 701L of the left surface 70L. The seat portion 724 is positioned leftward of the bottom portion of the recess 701R of the right surface 70R. The seat portions 722 and 724 extend in the frontward/rearward direction and are arrayed with each other in the leftward/rightward direction. The seat portions 722 and 724 are positioned frontward of the seat portions 721 and 723.

As illustrated in FIG. 6, the upper surface 70U has a left hole 70HL and a right hole 70HR. The left hole 70HL is formed at a position rearward of the seat portion 721, and the right hole 70HR is formed at a position rearward of the seat portion 723. These holes 70HL and 70HR have rectangular shape, and away from each other in the leftward/rightward direction. As illustrated in FIG. 5, a locking arm 78L extends through the left hole 70HL, and a locking arm 78R extends through the right hole 701-IR. The locking arms 78R and 78L will be collectively referred to as "locking arm 78." The locking arm 78 has a substantially quadrangular prism in shape. The locking arm 78 is an example of the second engaging portion of the present disclosure.

The locking arm 78 has an upper end portion protruding upward from the upper surface 70U. The locking arm 78 has a front surface provided with a protrusion 781 protruding frontward. The protrusion 781 has an upper surface sloping diagonally downward and frontward. In the internal space of the base portion 70, a shaft (not illustrated) extends in the leftward/rightward direction. The locking arm 78 has a lower end portion rotatably supported by the shaft. Hence, the locking arm 78 is pivotally movable about an axis of the shaft between a locking position (see FIG. 5) and an unlocking position. In the locking position, the locking arm 78 has an upright posture, and in the unlocking position, the locking arm 78 has an inclined posture inclined diagonally rearward. The locking arm 78 is urged in a direction from the unlocking position to the locking position by a spring (not illustrated) provided inside the base portion 70.

As illustrated in FIGS. 5 and 6, a cradle terminal 77 is provided at the upper surface 70U at a position between the left hole 70HL and the right hole 70HR through which the locking arms 78L and 78R respectively pass. The cradle terminal 77 includes a plurality of electrodes to which voltage V is applied in the state of connection of the jack of the AC adapter to the socket 702 (see FIG. 5). A wall portion 77A having a plate-like shape protrudes upward from the upper surface 70U so as to surround the cradle terminal 77. A part of the wall portion 77A is lacking at a rear end portion of the wall portion 77A to provide an opening portion.

The rear surface 70S of the base portion 70 is provided with a lever 79. The lever 79 is connected to the lower end portion of the locking arm 78 in the internal space of the base portion 70. The locking arm 78 is pivotally moved from the locking position to the unlocking position against the urging force of the spring positioned inside the base portion 70 in accordance with the operation of the lever 79.

A guide portion 71A is provided at the upper surface 70U. The guide portion 71A is recessed downward. Specifically, the guide portion 71A is elongated in a groove-like fashion extending in the leftward/rightward direction. The guide portion 71A is positioned between each bottom portion of the recesses 701L and 701R. The guide portion 71A has a groove width in the frontward/rearward direction substantially three times as large as a diameter of the wiring harness 62 of the eliminator 6 (see FIG. 3). The guide portion 71A has a groove depth substantially twice as large as the diameter of the wiring harness 62.

The guide portion 71A has a left end positioned between the seat portions 721, 723 and the seat portions 722, 724 in the frontward/rearward direction, and between the bottom portions of the recesses 701L and 701R in the leftward/rightward direction. The guide portion 71A has a right end positioned at the right end of the base portion 70. Specifically, the right end of the guide portion 71A is at the bottom portion of the recess 701R of the right surface 70R. The upper surface 70U of the base portion 70 is recessed downward to form the guide portion 71A, and the guide portion 71A extends rightward from a position between the left and right ends of the base portion 70 to the right end of the base portion 70, i.e., to the bottom portion of the recess 701R of the right surface 70R.

As illustrated in FIG. 6, a closed region R is formed by a region defined by four dotted chain line, that is, a dotted chain line connecting between a right end of the engagement portion 73R and a left end of the engagement portion 73L, a dotted chain line connecting between the left end of the engagement portion 73L and a left end of the locking arm 78L, a dotted chain line connecting between the left end of the locking arm 78L and a right end of the locking arm 78R, and a dotted chain line connecting between the right end of the locking arm 78R and the right end of the engagement portion 73R. The guide portion 71A in its entirety is substantially positioned in the closed region R as viewed from above. That is, the guide portion 71A is positioned in an area defined by the engagement portions 73R, 73L and the locking arms 78R, 78L.

<Holding Procedure of Printer 1 to Cradle 7A>

In the printer 1, the lid 17A (see FIGS. 3A and 3B) is already removed to expose the printer terminal 17 to the outside. Such printer 1 is positioned above the cradle 7A (see FIGS. 5 and 6). Then, the printer 1 approaches the cradle 7A in accordance with the movement of the printer 1 diagonally downward and frontward. Hence, as illustrated in FIG. 1, the protruding portion 731 of the engagement portion 73 of the cradle 7A is entered into the counterpart engagement portion 13. Accordingly, the engagement portion 73 of the cradle 7A is engaged with the counterpart engagement portion 13 of the printer 1, so that the front end of the printer 1 is held by the cradle 7A.

Then, downward force is applied to the rear end portion of the printer 1, so that the rear end portion of the printer 1 approaches the cradle 7A, and the open end of the counterpart locking portion 18 (see FIGS. 3A and 3B) in the printer 1 is brought into contact with an upper surface of the protrusion 781 of the locking arm 78 (see FIG. 5) in the cradle 7A. Since the upper surface of the protrusion 781 is inclined, rearward force is applied from the open end of the counterpart locking portion 18 to the upper end of the locking arm 78. Hence, the locking arm 78 is pivotally moved from the locking position to the unlocking position against the urging force of the spring positioned in the internal space of the base portion 70.

In accordance with further movement of the rear end portion of the printer 1 toward the cradle 7A, the protrusion 781 of the locking arm 78 of the cradle 7A (see FIG. 5) moves past the open end of the counterpart locking portion 18 of the printer 1 and enters thereinto. Hence, rearward force is not any more applied to the locking arm 78. As a result, the locking arm 78 of the cradle 7A is engaged with the counterpart locking portion 18 of the printer 1, so that the rear end portion of the printer 1 is held by the cradle 7A. Consequently, the printer 1 is held to the base portion 70 of the cradle 7A.

In the holding state of the printer 1 to the base portion 70 of the cradle 7A, the seat portion 72 provided at the upper surface 70U of the base portion 70 is in contact with the lower surface 10B of the casing 10 of the printer 1. Hence, the base portion 70 supports or holds the printer 1 from below through the seat portion 72. At this time, the plurality of electrodes of the printer terminal 17 (see FIGS. 3A and 3B) are in contact with the plurality of electrodes of the cradle terminal 77 of the cradle 7A (see FIGS. 5 and 6).

In a case where the printer 1 to which the battery 5 is attached is held to the cradle 7A (FIG. 3A) by way of the above-described holding procedure, the battery 5 is electrically connected to the cradle terminal 77 of the cradle 7 through the printer terminal 17 of the printer 1. Incidentally, voltage V rechargeable to the battery 5 is applied to the plurality of electrodes of the cradle terminal 77 in a state where the jack of the AC adapter is connected to the socket 702 of the cradle 7A. Hence, voltage V is applied to the battery 5 attached to the printer 1 through the cradle terminal 77 and the printer terminal 17 for charging the battery 5.

In a case where the printer 1 to which the eliminator 6 is attached is held to the cradle 7A (see FIG. 3B) by way of the above-described holding procedure, the connecting portion 62A of the wiring harness 62 with the main body portion 61 is positioned at a left end portion of the guide portion 71A of the base portion 70 in the cradle 7A. The wiring harness 62 is positioned in the guide portion 71A and is guided along the guide portion 71A. The guide portion 71A guides the wiring harness 62 in the direction from the connecting portion 62A with the main body portion 61 toward the other end (right end) of the wiring harness 62, and leads the wiring harness 62 out of the base portion 70 through the recess 701R of the right surface 70R of the base portion 70.

AC power is supplied to the wiring harness 62 through the right end thereof in a case where the AC plug at the right end of the wiring harness 62 is connected to the socket 702. The AC power is converted into the DC power by the converting portion 63 positioned between the left and right ends of the wiring harness 62 (see FIG. 4), and the DC power is supplied to the main body portion 61. The main body portion 62 supplies the DC power to the printer 1. Thus, the printer 1 held to the cradle 7A is driven by the DC power to perform printing operation.

<Detaching Procedure of Printer 1 from Cradle 7A>

The locking arm 78 of the cradle 7A is pivotally moved from the locking position to the unlocking position by operating the lever 79 while the printer 1 is held to the cradle 7A. Hence, locking engagement between the locking arm 78 of the cradle 7A and the counterpart locking portion 18 of the printer 1 is released. Then, upward force is imparted on the rear end portion of the printer 1. Hence, the locking arm 78 is moved away from the counterpart locking portion 18, and the rear end portion of the printer 1 is moved upward. Then, the printer 1 is moved diagonally upward and rearward. Hence, the counterpart engagement portion 13 of the printer 1 is disengaged from the engagement portion 73 of the cradle 7A. In this way, the printer 1 can be released from the cradle 7A.

<Cradle 7B>

Figure 7:
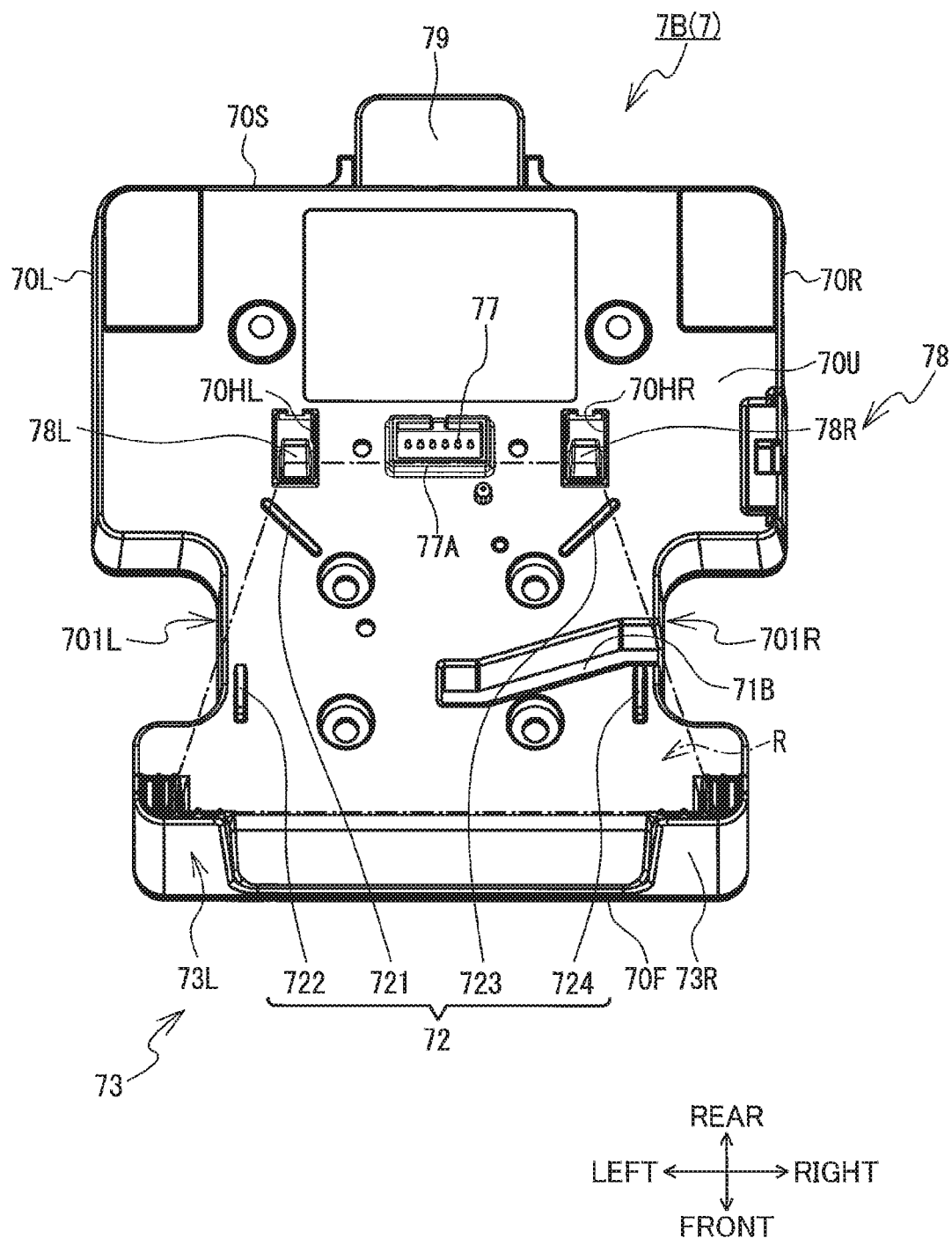
FIG. 7 is a perspective view of a cradle according to a second embodiment.

A cradle 7B according to a second embodiment will be described with reference to FIG. 7. The cradle 7B includes a guide portion 71B instead of the guide portion 71A of the cradle 7A of the first embodiment. An extending direction and size of the guide portion 71B are different from those of the guide portion 71A. Specifically, the guide portion 71B is an elongated groove-like recess inclined with respect to the leftward/rightward direction. The upper surface 70U of the base portion 70 is recessed downward to form the guide portion 71B, and the guide portion 71B extends to the right end of the base portion 70, i.e., to the bottom portion of the recess 701R of the right surface 70R. The guide portion 71B in its entirety is substantially positioned within the closed region R as viewed from above, similar to the guide portion 71A of the cradle 7A. The cradle 7B has a remaining structure the same as that of the cradle 7A.

In a case where the printer 1 to which the eliminator 6 is attached is held to the cradle 7B, the connecting portion 62A of the wiring harness 62 with the main body portion 61 of the eliminator 6 is positioned at a left end portion of the guide portion 71B of the base portion 70 in the cradle 7B. A part of the wiring harness 62 is positioned in the guide portion 71B and is guided along the guide portion 71B. The guide portion 71B guides the wiring harness 62 rightward, i.e., in the direction from the connecting portion. 62A with the main body portion 61 toward the right end of the wiring harness 62, and leads the wiring harness 62 out of the base portion 70 of the cradle 7B through the recess 701R of the right surface 70R of the base portion 70.

The guide portion 71B has a groove width in the frontward/rearward direction and a groove depth those are slightly greater than the diameter of the wiring harness 62 of the eliminator 6. The width and depth of the guide portion 71B are smaller than those of the guide portion 71A. Therefore, the wiring harness 62 can be at a stabilized position in the guide portion 71B. Consequently, no external force for bending the connecting portion 62A of the wiring harness 62 with the main body portion 61 of the eliminator 6 is applied to the connecting portion 62A in the holding state of the printer 1, to which the eliminator 6 is attached, to the cradle 7B.

<Cradles 7C and 7D>

Figure 8:
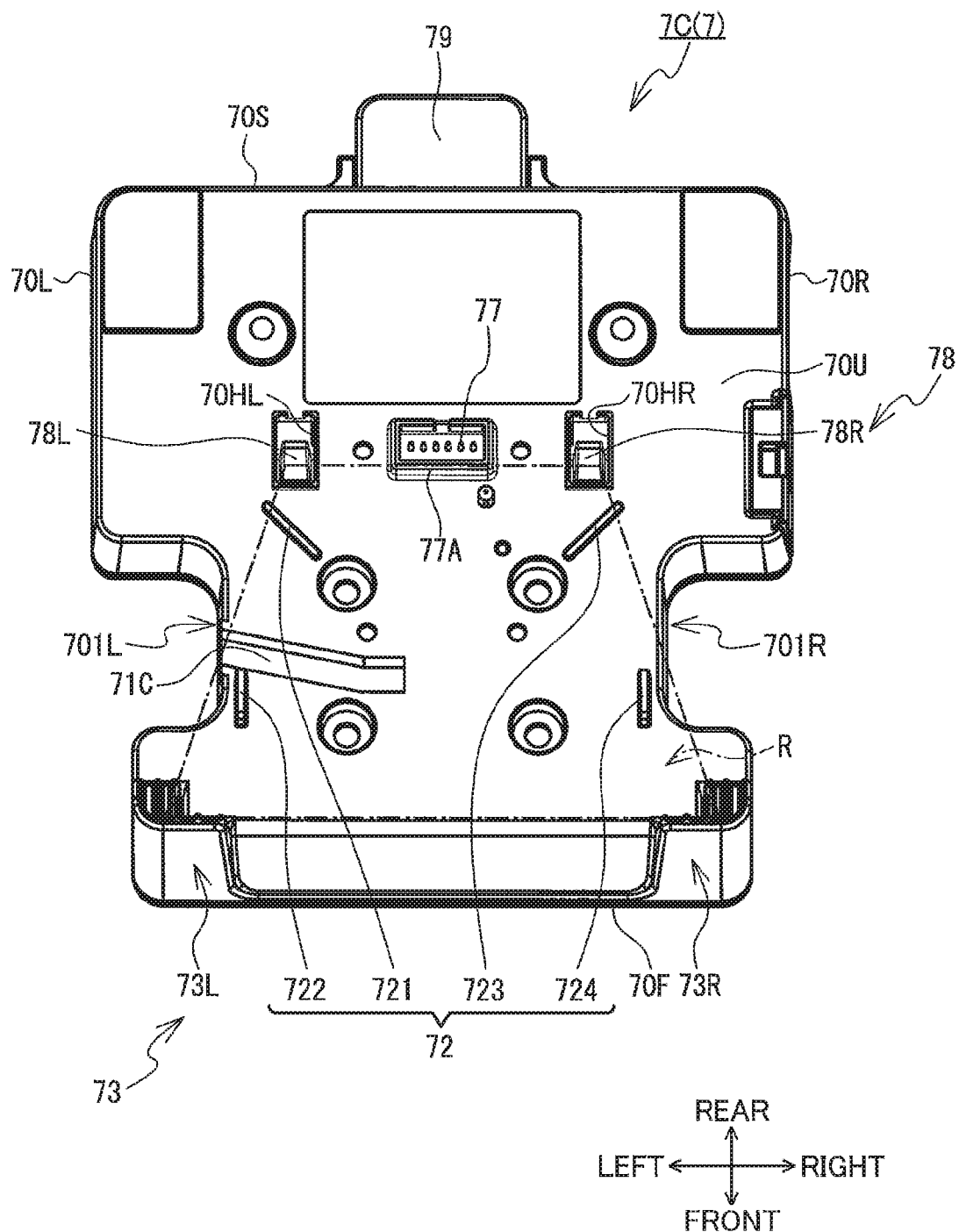
FIG. 8 is a perspective view of a cradle according to a third embodiment.
Figure 9:
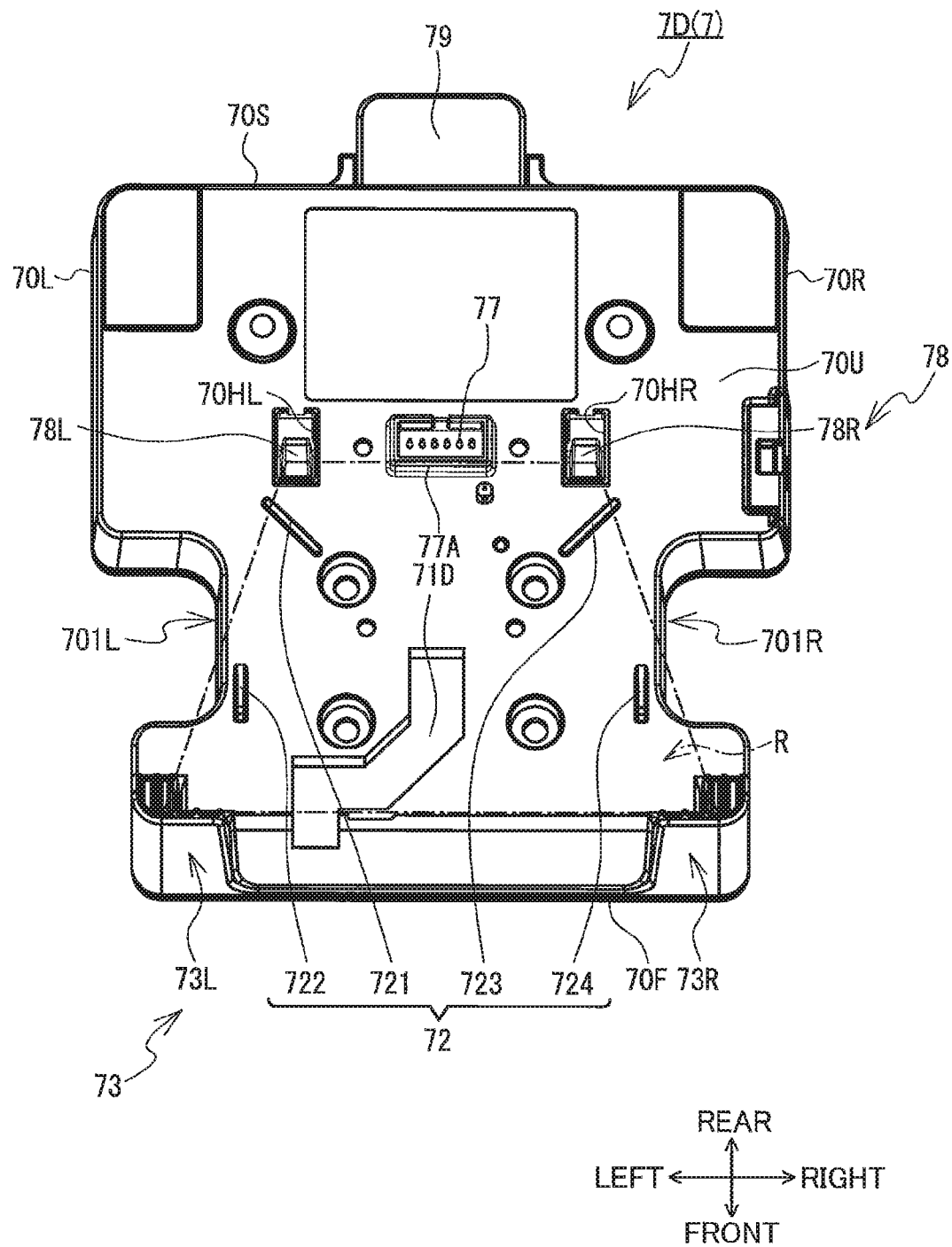
FIG. 9 is a perspective view of a cradle according to a fourth embodiment.

A cradle 7C according to a third embodiment and a cradle 7D according to a fourth embodiment will be described with reference to FIGS. 8 and 9, respectively. As illustrated in FIG. 8, the cradle 7C includes a guide portion 71C instead of the guide portion 71B of the second embodiment. Further, as illustrated in FIG. 9, the cradle 7D includes a guide portion 71D instead of the guide portion 71B of the second embodiment. The guide portions 71C and 71D are different from the guide portion 71B in terms of the extending direction thereof. The guide portions 71C and 71D are elongated groove-like recesses.

As illustrated in FIG. 8, the upper surface 70U of the base portion 70 is recessed downward to form the guide portion 71C, and the guide portion 71C extends leftward to the left end of the base portion 70, i.e., to the bottom portion of the recess 701L of the left surface 70L. As illustrated in FIG. 9, the upper surface 70U of the base portion 70 is recessed downward to form the guide portion 71D, and the guide portion 71l) extends frontward to the front end of the base portion 70, i.e., to the front surface 70F. The guide portions 71C and 71D in their entirety are substantially positioned within the closed region R as viewed from above, similar to the guide portions 71A and 71B. The cradles 7C and 7D have remaining structures the same as those of the cradles 7A and 7B.

Each of the cradles 7C and 7D is configured to hold a printer 1 to which an eliminator different from the eliminator 6 illustrated in FIGS. 3B and 4 is attached. Although not illustrated in the drawings, the different type of eliminator is different from the eliminator 6 in terms of the connecting position between the main body portion 61 and the wiring harness 62 and the lead-out direction of the wiring harness 62 from the base portion 70.

Regarding another type of eliminator, the right end of the wiring harness 62 is connected to the left end portion of the main body portion 61, and the wiring harness 62 extends leftward from the main body portion 61 contrary to the structure illustrated in FIG. 4. In the attached state of the other type of eliminator to the printer 1, and when such printer 1 is held to the cradle 7C, the connecting portion of the wiring harness 62 with the main body portion 61 of the eliminator is positioned at the right end portion of the guide portion 71C. A part of the wiring harness 62 is positioned in the guide portion 71C and is guided leftward along the guide portion 71C. The guide portion 71C guides the wiring harness 62 in the direction from the connecting portion with the main body portion 61 toward the left end of the wiring harness 62, and leads the wiring harness 62 out of the base portion 70 of the cradle 7C through the recess 701L of the left surface 70L of the base portion 70.

Regarding still another type of eliminator, one end of the wiring harness 62 is connected to the front end portion of the main body portion 61, and the wiring harness 62 extends frontward from the main body portion 61 contrary to the structure illustrated in FIG. 4. In the attached state of the still another type of eliminator to the printer 1, and when such printer 1 is held to the cradle 7D, the connecting portion of the wiring harness 62 with the main body portion 61 of the eliminator is positioned at the rear end portion of the guide portion 71D. A part of the wiring harness 62 is positioned in the guide portion 71D and is guided frontward along the guide portion 71D. The guide portion 71D guides the wiring harness 62 in the direction from the connecting portion with the main body portion 61 toward the other end of the wiring harness 62, and leads the wiring harness 62 out of the base portion 70 of the cradle 7D through the front surface 70F thereof.

According to the cradles 7C and 7D, lead-out directions of the wiring harness 62 from the base portion 70 can be different from the lead-out direction of the wiring harness 62 from the base portion 70 of the cradle 7B. As such, various types of eliminators are available in the cradle 7 by changing the position and shape of the guide portion.

<Cradles 7E and 7F>

Figure 10:
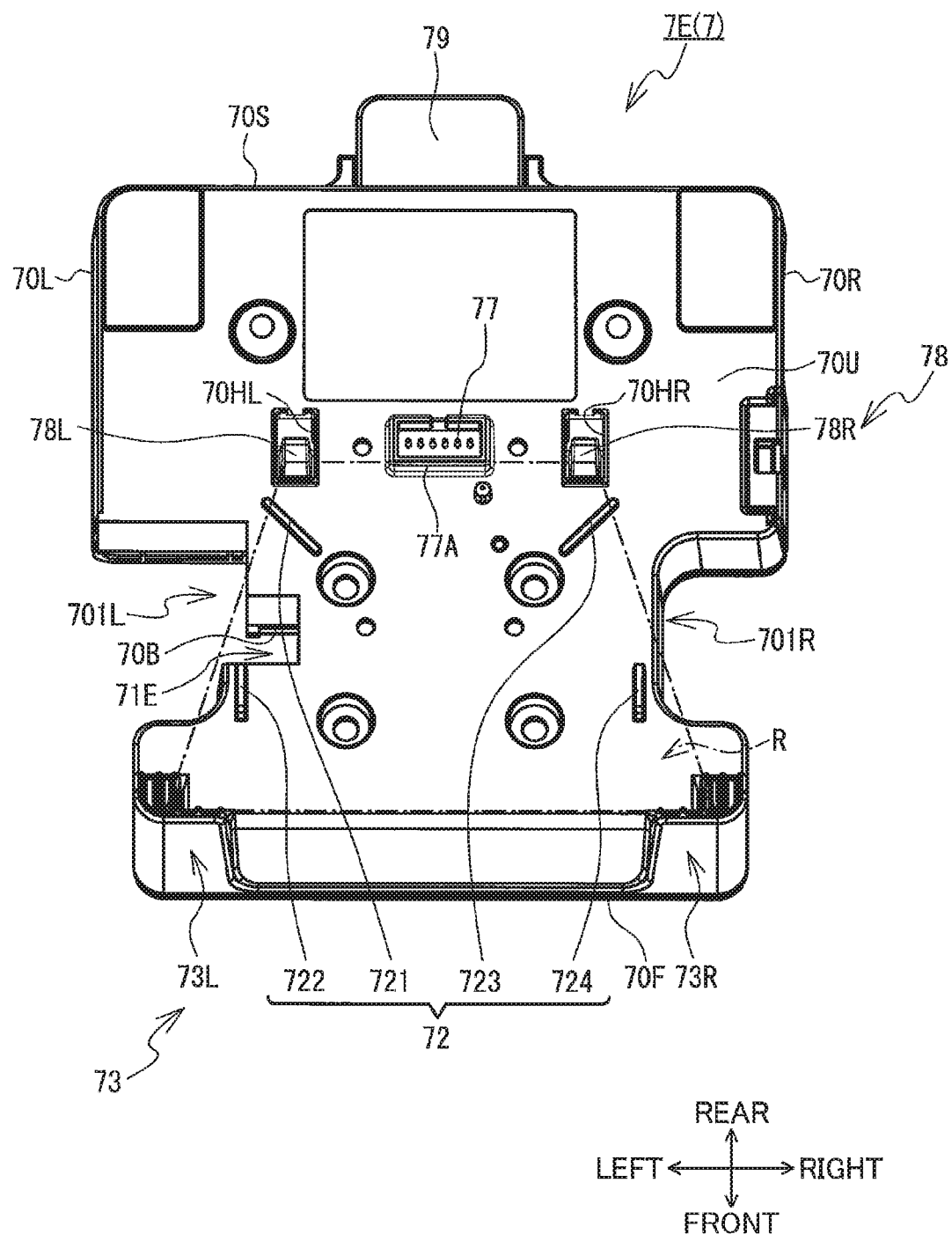
FIG. 10 is a perspective view of a cradle according to a fifth embodiment.
Figure 11:
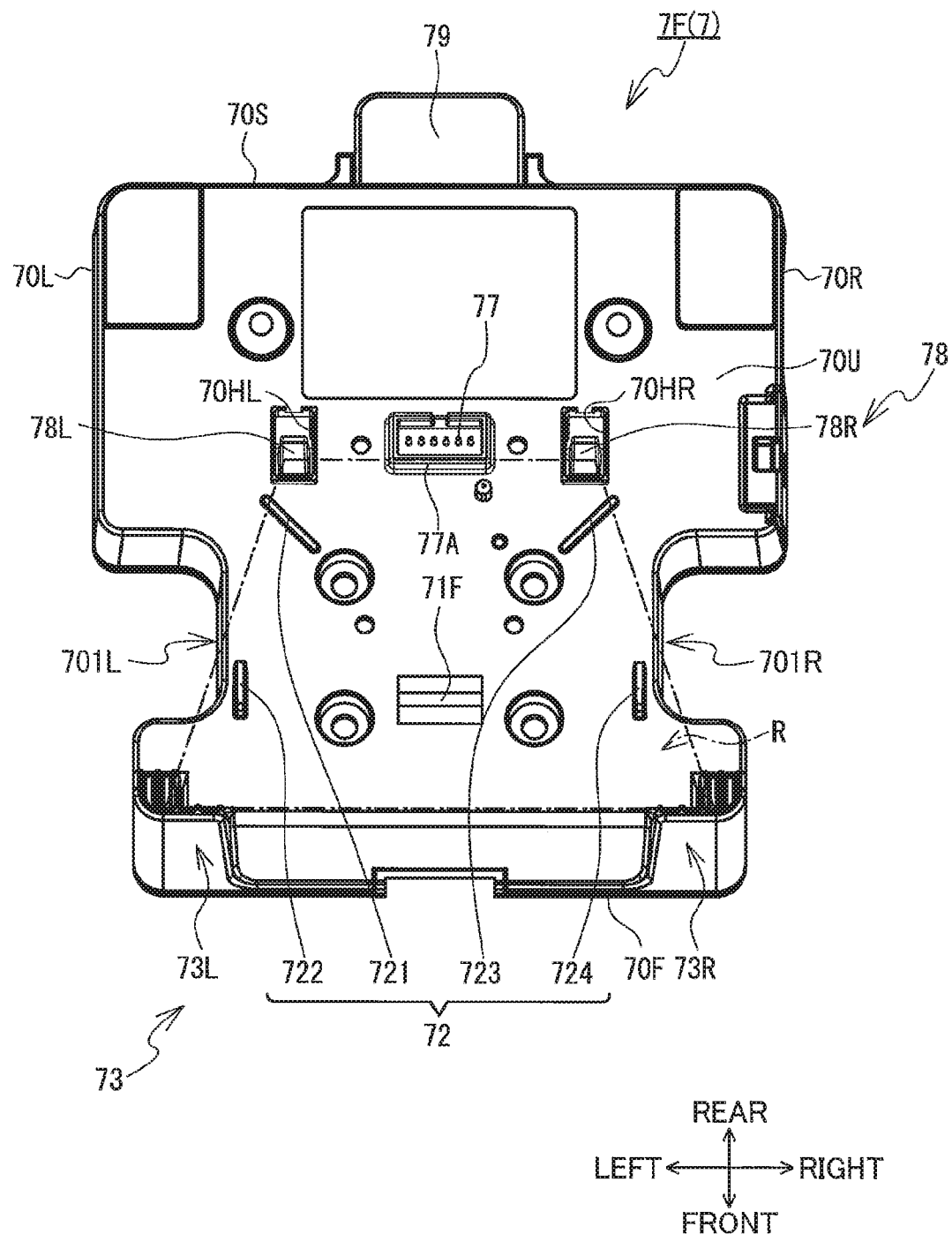
FIG. 11 is a perspective view of a cradle according to a sixth embodiment.

A cradle 7E according to a fifth embodiment and a cradle 7F according to a sixth embodiment will be described with reference to FIGS. 10 and 11, respectively. As illustrated in FIG. 10, the cradle 7E includes a guide portion 71E instead of the guide portion 71A of the first embodiment. The guide portion 71E is a notched portion formed at the recess 701L of the left surface 70L. Further, as illustrated in FIG. 11, the cradle 7F includes a guide portion 71F instead of the guide portion 71A of the first embodiment. The guide portion 71F is a through-hole having a rectangular shape and penetrating the upper surface 70U and the lower surface 70B of the base portion 70.

Each of the guide portions 71E and 71F extends from the upper end to the lower end of the base portion 70, and specifically extends from the upper surface 70U to the lower surface 70B of the base portion 70. The guide portions 71E and 71F in their entirety are substantially positioned within the closed region R as viewed from above, similar to the guide portions 71A through 71D. The cradles 7E and 7F have remaining structures the same as those of the cradles 7A through 7D.

Each of the cradles 7E and 7F is configured to hold a printer 1 to which an eliminator different from the above-described eliminators is attached. Although not illustrated in the drawings, the further different type of eliminator is different from the above-described eliminators in terms of the connecting position between the main body portion 61 and the wiring harness 62 and the lead-out direction of the wiring harness 62 from the base portion 70.

Regarding the further different type of eliminator, one end of the wiring harness 62 is connected to the left end portion of the main body portion 61, or the leftward/rightward center portion of the main body portion 61, and the wiring harness 62 extends downward from the main body portion 61 contrary to the structure illustrated in FIG. 4. In the attached state of the further different type of eliminator to the printer 1, and when such printer 1 is held to the cradle 7E or the cradle 7F, the connecting portion of the wiring harness 62 with the main body portion 61 of the eliminator is positioned at the upper end portion of the guide portion 71E or the guide portion 71F. A part of the wiring harness 62 is positioned in the guide portion 71E or the guide portion 71F and is guided downward along the guide portion 71E or the guide portion 71F. The guide portion 71E or the guide portion 71F guides the wiring harness 62 in the direction form the connecting portion with the main body portion 61 toward the other end of the wiring harness 62, and leads the wiring harness 62 out of the base portion 70 of the cradle 7E or the cradle 7F through the lower surface 70B of the base portion 70. As such, various types of eliminators are available in the cradle 7 by changing the position and shape of the guide portion.

Advantageous Effects of Embodiments

In the cradle 7, one of the guide portions 71A through 71F (collectively referred to as "guide portion 71") is provided in the base portion 70 where the printer 1 is held for guiding the wiring harness 62 of the eliminator 6 and positioning the wiring harness 62 in the guide portion 71. Therefore, the guide portion 71 can prevent the wiring harness 62 from being nipped between the lower surface 10B of the printer 1 and the upper surface 70U of the cradle 7 in a state where the printer 1 is held to the cradle 7. Accordingly, the cradle 7 can hold the printer 1 in a stabilized manner.

If the guide portion 71 were not provided in the cradle 7, the wiring harness 62 of the eliminator 6 were nipped between the lower surface 10B of the printer 1 and the upper surface 70U of the cradle 7 in the holding state of the printer 1 to the cradle 7. In this case, a distance between the lower surface 70B of the cradle 7 and the upper surface 10U of the printer 1, i.e., the total thickness of the cradle 7 and printer 1 becomes greater by the diameter of the wiring harness 62 than the sum of the thickness of the cradle 7 and the thickness of the printer 1.

On the other hand, according to the embodiments described above, since the guide portion 711s provided in the cradle 7, the distance between the lower surface 70B of the cradle 7 and the upper surface 10U of the printer 1 almost equals to the sum of only the thickness of the cradle 7 and the thickness of the printer 1. Thus, since the guide portion 71 is provided in the base portion 70 of the cradle 7, even if the eliminator 6 is attached to the printer 1, the diameter of the wiring harness 62 does not lead to an increase of the total thickness of the cradle 7 and printer 1. Accordingly, space saving can be realized with respect to the holding state of the printer 1 to the cradle 7.

In the holding state of the printer 1 to the base portion 70 while the main body portion 61 of the eliminator 6 is accommodated in the accommodating portion 16 of the printer 1, the guide portion 71 of the cradle 7 extends from the connecting portion 62A of the wiring harness 62 with the main body portion 61 to an end surface of the base portion 70. In this state, the guide portion 71 guides a portion of the wiring harness 62, the portion being from the connecting portion 62A of the wiring harness 62 with the main body portion 61 to the end surface of the base portion 70. Hence, the cradle 7 can appropriately restrain the wiring harness 62 from being nipped between the lower surface 10B of the printer 1 and the upper surface 70U of the base portion 70.

The guide portions 71A through 71D are recesses formed at the upper surface 70U of the base portion 70. With this structure, the guide portion (recess) can position the wiring harness 62 therein and hence can restrain the wiring harness 62 from protruding upward from the upper surface 70U of the base portion 70. Hence, in the cradle 7, performance for holding the printer 1 by the base portion 70 can further be stabilized. Further, entire thickness of the assembly of the printer 1 and the cradle 7, i.e., thickness from the upper surface 1011 of the printer 1 to the lower surface 70B of the cradle 7 in the holding state of the printer 1 to the cradle 7 can be close to the sum of the thickness of the printer 1 and the thickness of the cradle 7. Hence, the entire thickness of the assembly of the printer 1 and the cradle 7 can be reduced to the minimum thickness.

The guide portions 71A through 71D are elongated grooves formed at the upper surface 70U of the base portion 70. The guide portion 71E is the notch formed at the recess 701L of the left surface 70L of the base portion 70. The guide portion 71F is the through-hole extending from the upper surface 70U to the lower surface 70B of the base portion 70. With these structures, the cradle 7 can easily provide the structure for guiding the wiring harness 62 by the groove or the notch.

Further, the guide portion 71 can also function as a flow passage that can drain a liquid entered onto the upper surface 70U toward the end of the base portion 70. Hence, the cradle 7 can reduce the possibility of a short circuit due to water droplets adhered onto the upper surface 70U of the base portion 70 coming into contact with the cradle terminal 77 and can reduce the possibility of adhesion of water droplets adhered onto the upper surface 70U of the base portion 70 to the printer 1 held by the cradle 7.

The cradle terminal 77 of the cradle 7 is in contact with the printer terminal 17 of the printer 1 in the holding state of the printer 1 to the cradle 7. At this time, the seat portion 72 of the cradle 7 is in contact with the lower surface 10B of the printer 1, and the upper surface 70U of the base portion 70 is positioned adjacent to the lower surface 10B of the printer 1. However, since the wiring harness 62 of the eliminator 6 is guided by the guide portion 71, nipping of the wiring harness 62 between the lower surface 10B of the printer 1 and the seat portion 72 and between the lower surface 10B of the printer 1 and the upper surface 70U of the base portion 70 does not occur.

In this way, the cradle 7 can prevent the wiring harness 62 from being nipped between the printer 1 and the cradle 7 in a case of closed positional relationship between the printer 1 and the cradle 7 for electrically connecting the printer terminal 17 to the cradle terminal 77. Thus, increase in entire thickness of the assembly of the printer 1 and the cradle 7 can be restrained.

Voltage V is applied to the cradle terminal 77 of the cradle 7. The battery 5 is charged by the applied voltage V through the cradle terminal 77 and the printer terminal 17 in the holding state of the printer 1, to which the battery 5 is attached, to the cradle 7. In this way, the cradle 7 can allow the battery 5 to be charged through the printer terminal 17 and the cradle terminal 77 when the cradle 7 is employed as a charging stand while the printer 1 to which the battery 5 is attached is held to the cradle 7.

The guide portion 71 is positioned within the closed region R encircled by the imaginary linear lines passing through the engagement portion 73R, the engagement portion 73L, the locking arm 78L, the locking arm 78R, and the engagement portion 73R in this order. With this structure, the cradle 7 can suitably hold the printer 1 to the base portion 70 while the wiring harness 62 of the eliminator 6 is guided by the guide portion 71. Further, the cradle 7 can restrain positional displacement of the connecting portion 62A of the wiring harness 62 with the main body portion 61 of the eliminator 6 relative to the guide portion 71 particularly within the closed region R. Therefore, disengagement of the wiring harness 62 from the guide portion 71 unlikely occur while the printer 1 to which the eliminator 6 is attached is held to the cradle 7.

Modifications

While the description has been made in detail with reference to specific embodiments, it would be apparent to those skilled in the art that various changes and modifications may be made thereto.

In the embodiments described above, the lower surface 70B of the base portion 70 of the cradle 7 faces downward. In this case, the printer 1 is held to the cradle 7 by mounting the printer 1 upon the seat portion 72 of the upper surface 70U of the base portion 70 in the cradle 7. However, orientation or posture of the cradle 7 is not limited to those in the embodiments described above. For example, the cradle 7 may be fixed to a wall extending perpendicular to the horizontal direction, such that the lower surface 70B of the base portion 70 faces the wall. In this case, the front surface 70F of the base portion 70 may face upward or downward.

The upper surface 70U of the base portion 70 may include a sloped portion sloped downward toward the guide portion 71. With this structure, the cradle 7 can efficiently direct the liquid adhered to the upper surface 70U toward the guide portion 71.

In the cradle 7 according to the embodiments described above, single guide portion 71 extends from the connecting portion 62A of the wiring harness 61 with the main body portion 61 of the eliminator 6 to the end surface of the base portion 70. However, a plurality of guide portions may be formed from the connecting portion 62A to at least two of the front surface 70F, the right surface 70R, the left surface 70L, the lower surface 70I, and the rear surface 70S of the base portion 70. With such a structure, the cradle 7 is available for various types of eliminators whose extending direction of the wiring harness 62 from the main body portion 61 are different from each other.

Further, a printer whose lower surface is formed with a recess may be used for accommodating a part of the wiring harness 62 of the eliminator 6. In such a case, a guide portion of the cradle 7 may extend from the connecting portion 62A of the wiring harness 62 with the main body portion 61 of the eliminator 6 to the recess. Hence, the wiring harness 62 may be guided by the guide portion of the base portion 70 and the recess of the printer. In this case, the guide portion may not extend to the end surface of the base portion 70.

The cradle terminal 77 of the cradle 7 may not be provided at the upper surface 70U of the base portion 70. Further, the printer terminal 17 of the printer 1 may not be provided at the lower surface 10B of the printer 1. For example, each side surface (such as the front surface, the right surface, the left surface, and the rear surface) of each of the printer 1 and the cradle 7 may be provided with a connector to which a cable is connectable for providing electrical connection between the printer 1 and the cradle 7. With this structure, voltage V may be applied from the cradle 7 to the battery 5 attached to the printer 1 through the cable to charge the battery 5.

The printer terminal 17 may be omitted from the printer 1, and the cradle terminal 77 may be omitted from the cradle 7. For example, the cradle 7 may be provided with a primary coil to which high-frequency power can be supplied, and the battery 5 may be provided with a secondary coil. The primary coil and the secondary coil may be positioned adjacent to each other when the printer 1 is held to the cradle 7. With this state, inductive power is generated in the secondary coil by supplying the high-frequency power to the primary coil. The battery 5 may be charged with the inductive power.

The seat portion 72 may be omitted from the upper surface 70IJ of the base portion 70 of the cradle 7. In this case, the cradle 7 may hold the printer 1 by bringing the upper surface 70U of the base portion 70 into direct contact with the lower surface 10B of the printer 1.

In the embodiments described above, almost all portion of the guide portion 71 is positioned within the closed region R encircled by the imaginary lines passing through the engagement portion 73R, the engagement portion 73l, the locking arm 78L the locking arm 78R, and the engagement portion 73R in this order. Preferably, not less than 80% of the guide portion 71 is positioned within the closed region R.

Further, numbers of the engagement portions 73 and locking arms 78, those being engaging portions and provided at the cradle 7, are not limited to four, but may, be two, three, five, and more. For example, assuming that N numbers of engaging portions are provided (N is an integer greater than or equal to three), shape of corresponding closed region R becomes N-sided polygonal shape whose vertex is each engaging portion. Further, assuming that the cradle 7 is provided with only two engaging portions 73 and 78, the guide portion 71 may be provided at a position crossing an imaginary line connecting the two engaging portions 73 and 78, that is, at a position between the two engaging portions 73 and 78.

The printer 1 may include a wiring harness connected to the lower surface 10B of the casing 10. In other words, the wiring harness may directly extend from the lower surface 10B of the printer 1. The wiring harness may supply DC power to the printer 1 directly. In a case where such printer is held to the cradle 7, the connecting portion of the wiring harness with the lower surface 10B may be positioned at one end portion of the guide portion 71. That is, the guide portion 71 may guide the wiring harness directly connected to the printer 1 while the printer 1 is held to the cradle 7

What is claimed is:

1. A cradle for use with a printer, a selected one of a battery and a converter being detachably attachable to the printer, the printer being driven by DC power supplied from an attached one of the battery and the converter to perform printing operation, the converter including: a main body portion; and a wiring harness having a first end connected to the main body portion and a second end, the converter being configured to convert AC power supplied through the second end into DC power to be supplied to the printer through the first end, the printer including an accommodating portion configured to accommodate therein the battery when the battery is attached to the printer and to accommodate therein the main body portion when the converter is attached to the printer, the cradle comprising:
a base portion configured to hold the printer to which one of the battery and the converter is attached; and
a guide portion provided at the base portion and configured to guide the wiring harness in a case where the converter is attached to the printer.

2. The cradle according to claim 1, wherein the base portion has an end surface, and the guide portion has a first end portion configured to receive the first end of the wiring harness connected to the main body portion and a second end portion positioned at the end surface to lead the wiring harness out of the base portion.

3. The cradle according to claim 1, wherein the guide portion is in a form of a groove recessed in the base portion, the wiring harness being insertable in the groove.

4. The cradle according to claim 1, wherein the guide portion is in a form of a recess which is open at the end surface, the wiring harness being insertable in the recess.

5. The cradle according to claim 1, wherein the guide portion is in a form of a through-hole opening at the end surface, the wiring harness being insertable in the through-hole.

6. The cradle according to claim 1, wherein the base portion comprises a seat portion in contact with the printer when the printer is held to the base portion.

7. The cradle according to claim 1, further comprising a cradle terminal provided at the base portion, the cradle terminal being in contact with a printer terminal of the printer when the printer is held to the base portion.

8. The cradle according to claim 7, wherein the printer terminal is electrically contactable with the battery accommodated in the accommodating portion, and
wherein the cradle terminal is configured to be applied with voltage capable of charging the battery.

9. The cradle according to claim 1, wherein the base portion comprises a first engaging portion and a second engaging portion, the printer further includes a first counterpart engaging portion and a second counterpart engaging portion, and the first engaging portion is configured to engage with the first counterpart engaging portion and the second engaging portion is configured to engage with the second counterpart engaging portion to hold the printer to the base portion, and
wherein the guide portion is positioned between the first engaging portion and the second engaging portion.

10. A cradle comprising:
a base portion having an end surface and configured to hold a printer from which a wiring harness extends, the wiring harness having a first end and a second end, the first end being connected to the printer; and
a guide portion provided at the base portion and configured to guide the wiring harness, the guide portion having:
a first end portion configured to receive the first end of the wiring harness; and
a second end portion positioned at the end surface to lead the second end of the wiring harness out of the base portion.

* * * * *